United States Patent
Chang

(10) Patent No.: US 6,611,941 B1
(45) Date of Patent: Aug. 26, 2003

(54) METHOD FOR RAMDAC TESTING

(75) Inventor: Yu-Chuan Chang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/413,498

(22) Filed: Oct. 6, 1999

(51) Int. Cl.⁷ .................. G06F 11/00; G01R 31/28; G09G 1/28
(52) U.S. Cl. ............... 714/819; 714/724; 714/726; 345/536; 345/559; 345/589
(58) Field of Search ................. 714/799, 724, 714/726, 819; 345/536, 530, 559, 589, 600, 781

(56) References Cited

U.S. PATENT DOCUMENTS

| | | | | |
|---|---|---|---|---|
| 4,244,048 A | * | 1/1981 | Tsui | 714/726 |
| 5,083,119 A | * | 1/1992 | Trevett et al. | 345/559 |
| 5,442,379 A | * | 8/1995 | Bruce et al. | 345/589 |
| 5,875,293 A | * | 2/1999 | Bell et al. | 714/27 |

* cited by examiner

Primary Examiner—Emmanuel L. Moise
(74) Attorney, Agent, or Firm—Birch, Stewart, Kolasch & Birch, LLP

(57) ABSTRACT

A method of testing a plurality of registers in a RAMDAC, each of the registers having a plurality of bits. First, the bits of the registers are all reset to a first logic state. Then, one logic pattern is written to the registers so as to convert one bit of one of the registers into a second logic state and immediately read out. If the read logic pattern differs from the written logic pattern, an error message will be prompted. The steps are repeated until the testing of each of the bits of the registers is completed.

3 Claims, 16 Drawing Sheets

METHOD FOR RAMDAC TESTING

BACKGROUND OF THE INVENTION

1. Field of the Invention

The present invention relates to a technology of computer manufacturing, particularly to a method of testing RAMDAC.

2. Description of the Related Art

Computer display units use analog signals, whereas computer systems process mainly digital data. Hence, a digital-to-analog (thereafter, DAC) is found in a display control system for converting digital data into analog signals and driving the display units to display images. The digital data inputted into the DAC are from RAM, and are also referred as RAMDAC.

Referring to FIG. 1, a block diagram illustrates a conventional display control system. As shown in FIG. 1, the display control system 1 comprises: a display controller 10, RAMDAC 20, and a display memory (commonly known as video random access memory, or VRAM) 30. The display controller 10, RAMDAC 20 and the display memory 30 can be integrated into a single circuit board as a display adapter and coupled to the computer motherboard through an expansion slot. Moreover, the display controller 10, RAMDAC 20 and the memory display 30 may be built into the computer motherboard.

The display controller 10 serves as an interface between a central processing unit (CPU) 2 and the display control system 1. In FIG. 1, the display controller 10 communicates data through a system bus 3 with the CPU 2, and outputs horizontal synchronous signals HSYNC and vertical synchronous signals VSYNC for synchronic control of a display unit 4. Moreover, the data to be displayed onto the display unit 4 (thereafter, display data) are saved in the display memory 30 by the display controller 10. The display unit 4 can be a cathode ray tube (CRT) display or a flat panel display.

Referring to FIG. 2, a block diagram illustrates the detailed RAMDAC 20 of FIG. 1. In FIG. 2, the RAMDAC 20 comprises an address decoder 21, a color lookup table 22 composed of several registers, and three DACs 23–25. The display data on the address bus A (normally 8-bit data) are decoded by the address decoder 21 and utilized to select the color value stored in a corresponding register of the lookup table 22. The selected color value is converted into R, G, B video signals by the DACs 23–25 to be displayed onto the display unit 4. For example, 256 registers will be required for the color lookup table 22 to support the 320×200 pixels in 256 colors mode in VGA specification.

Normally, the three primary colors of R, G, and B are each represented in six bits; therefore, each register has a total of 18 bits. The color value stored in each register are provided by the CPU 2 and written therein through a data bus D. Conversely, the color values stored in the registers can be read out through the data bus D. The reading and writing operations are performed by the display controller 10 with a read/write control signal R/W (as shown in FIG. 1).

However, two requirements have yet to be met for the display control system 1 to display the correct colors. Firstly, the registers have to correctly read, write and save the color values in the color lookup table 22. And secondly, the DACs 23–25 have to correctly convert the digital color values into analog R, G, and B video signals.

SUMMARY OF THE INVENTION

Therefore, the present invention provides a RAMDAC testing method, capable of testing whether registers correctly read, write and save color values and rendering even R, G, and B color layers for visual inspection whether the RAMDACs correctly convert digital color values into analog R, G, and B video signals.

To achieve the above objects, the present invention provides a method of testing a plurality of registers in a RAMDAC, each of the registers having a plurality of bits. First, the bits of the registers are all reset to a first logic state. Then, one logic pattern is written to the registers so as to convert one bit of one of the registers into a second logic state and immediately read out. If the read logic pattern differs from the written logic pattern, an error message will be prompted. The steps are repeated until the testing of each of the bits of the registers is completed.

Moreover, the present invention provides a method for testing digital/analog converters in a RAMDAC. First, a display area of a display unit is divided into three display zones. Then, digital color data are converted by the digital/analog converters into analog video signals where digital color data are sequentially changed. Next, R, G, and B color layers are displayed responsive to the analog video signals in the display zones, respectively. Finally, it is determined whether the display unit displays the R, G, and B color layers evenly.

BRIEF DESCRIPTION OF THE DRAWINGS

The aforementioned objects, features and advantages of the present invention will become apparent by referring to the following detailed description of a preferred embodiment with reference to the accompanying drawings, wherein.

DETAILED DESCRIPTION OF THE PREFERRED EMBODIMENTS

The correct display of colors for a control display system 1 is contingent upon the correct read, write and save of registers in the color lookup table 22 and the correct conversion of digital color value into analog R, G, and B video signals. Therefore, the RAMDAC testing method of the present invention is basically divided into two aspects: register testing method and displaying method of even R, G, and B color layers. The former method detects whether registers can correctly read, write, and save color values; while the latter prompts for visually inspecting whether the RAMDACs correctly convert digital color data into analog R, G, and B video signals through even display of R, G, and B color layers.

Referring to FIGS. 3A–3G, flowcharts illustrating the register testing method in accordance with a first preferred embodiment of the present invention. This embodiment is specified with examples of R, G, B color layers represented in six bits.

Figure 1:
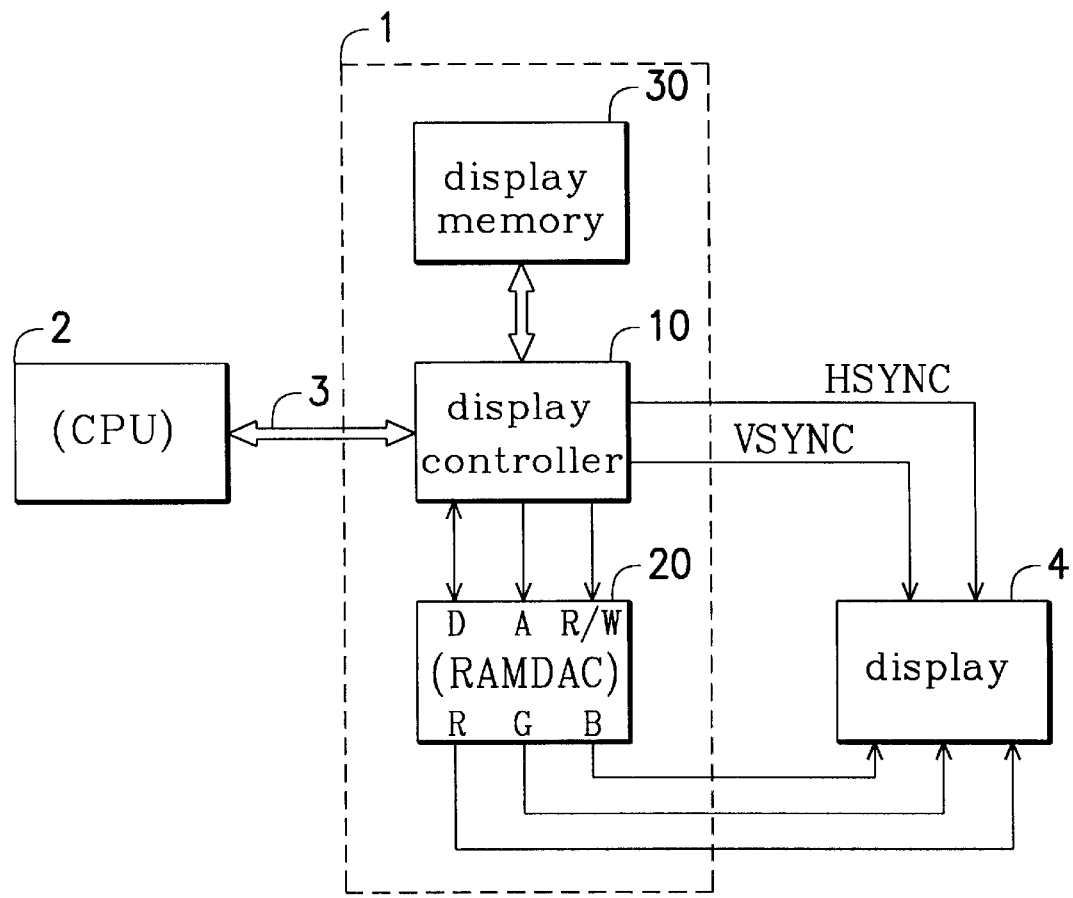
FIG. 1 is a block diagram illustrating a conventional computer display control system.
Figure 2:
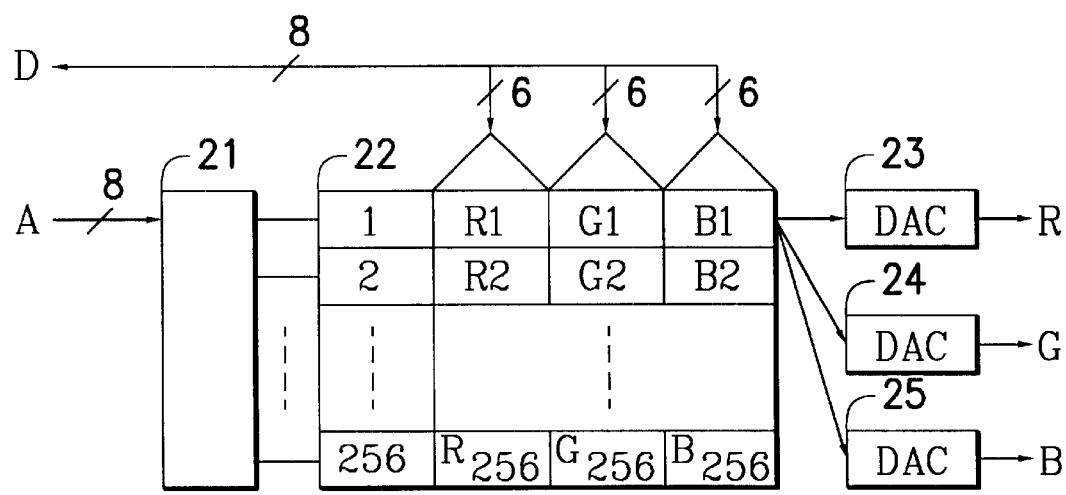
FIG. 2 is a block diagram illustrating the details of RAMDAC 20 of FIG. 1.
Figure 3A:
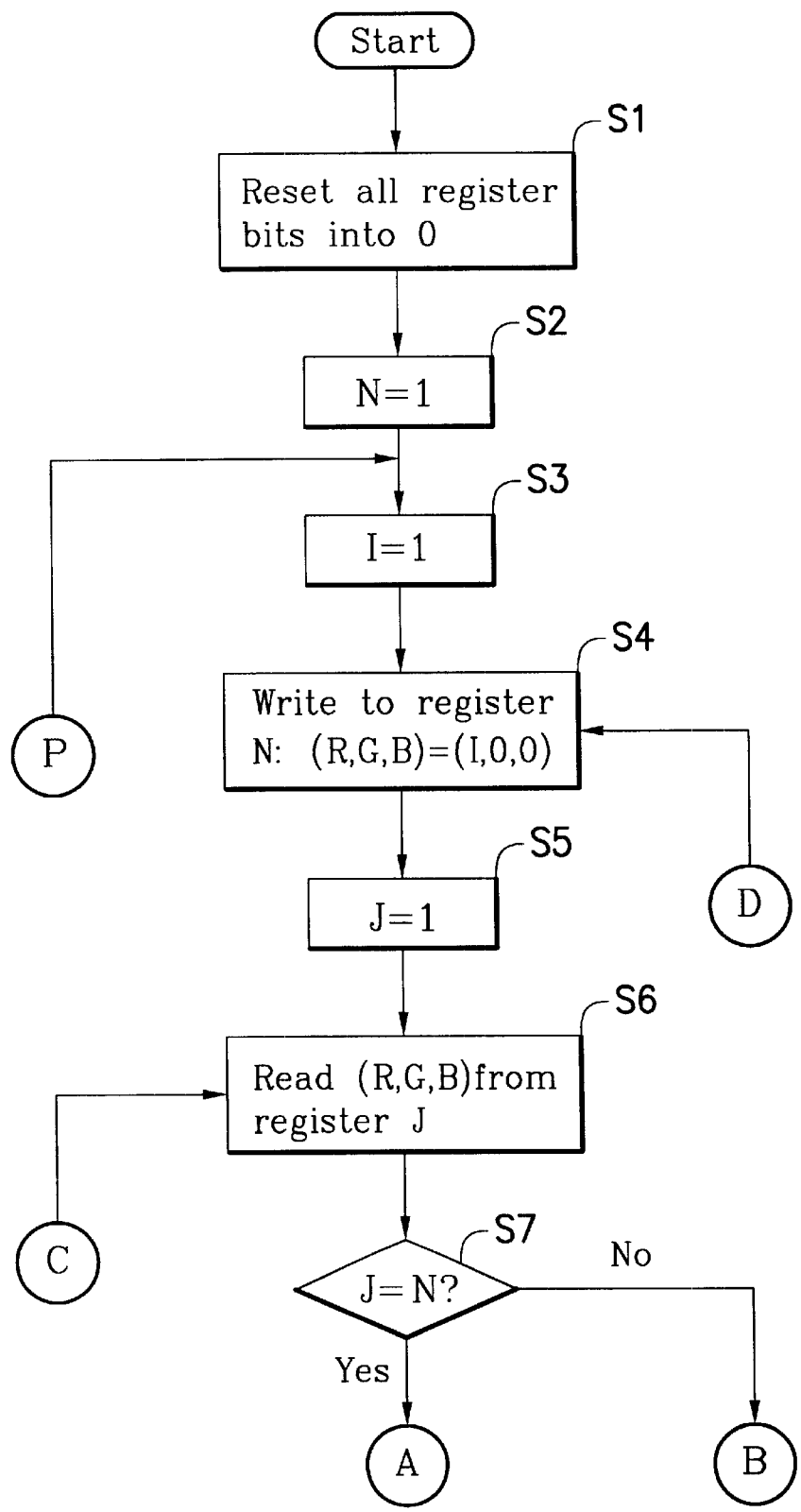
FIGS. 3A–3G are flowcharts illustrating the register testing method in accordance with a first preferred embodiment of the present invention.

Referring to FIG. 3A, first the color value in each register of the RAMDAC is reset to 0 in step S1. Next, the initial values of N and I are respectively set to 1 in steps S2 and S3. Further (I, 0, 0) is written into the R, G, and B color values in the register N ($R_N,G_N,B_N$) in step S4. Furthermore, the initial value of J is set to 1 in step S5; and the R, G, and B colorvalues ($R_J,G_J,B_J$) are read from the register J in step S6; followed by step S7, wherein it is determined whether J is equal to N.

Figure 3B:
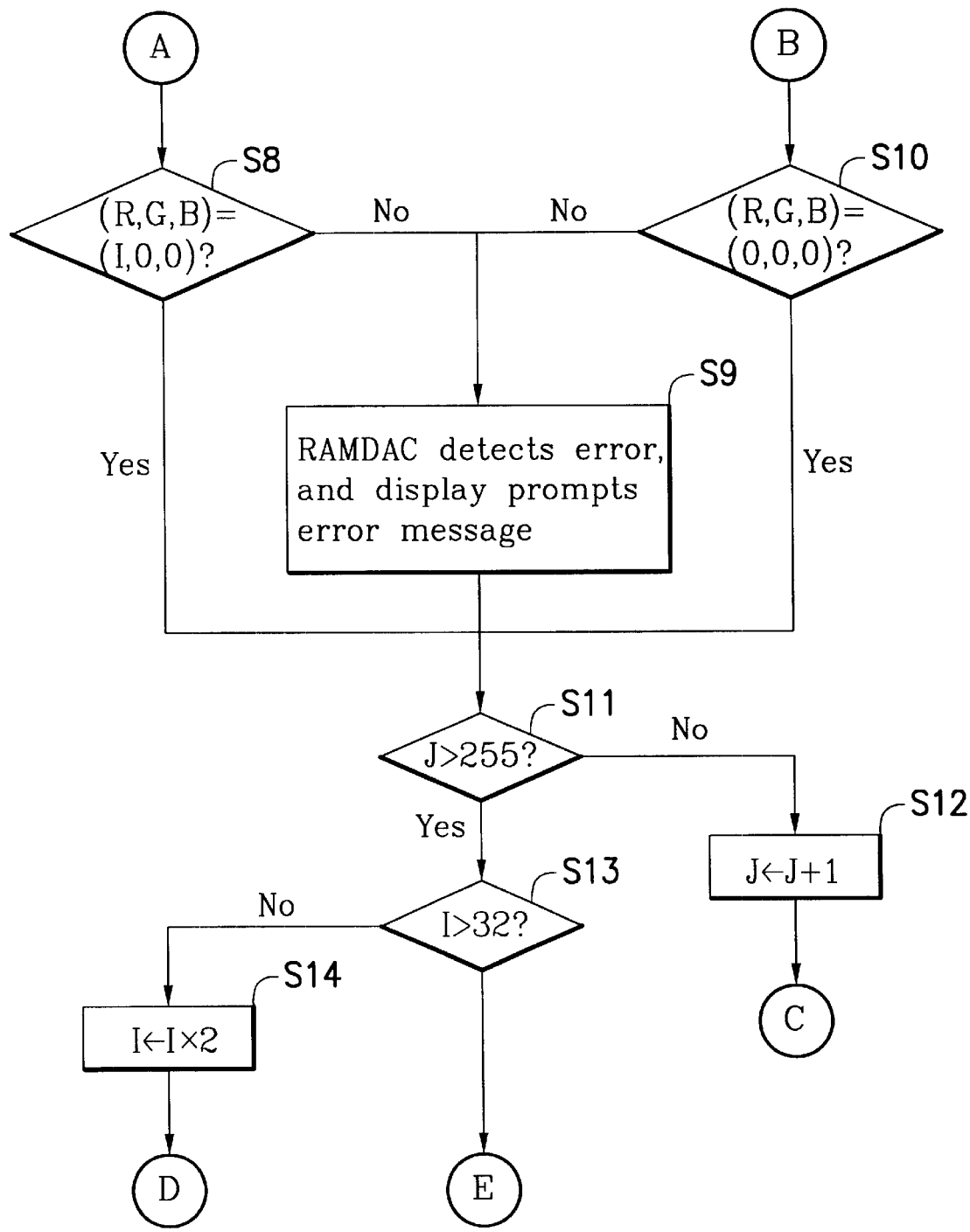

Referring to FIG. 3B, if it is known that J equals N in step S7, then proceed to step S8 to further determine whether the color values of the register J ($R_J,G_J,B_J$) equal (I,0,0). If not, then proceed to step S9 to display an error message. If in step S7, it is known that J does not equal N, then proceed to step S10 to determine whether the R, G, and B color values of the register J ($R_J$, $G_J$, $B_J$) equal (0,0,0); if not, an error message is displayed in step S9. If it is known in steps S8 and S10 that the color values of the register J ($R_J,G_J,B_J$) equal to (I, 0, 0) or (0,0,0), respectively, then proceed to step S11, wherein it is determined whether J is greater than 255. If J is smaller than or equal to 255, then proceed to step S12 to increase the value of J by one, and return to step S6. If J is greater than 255, then proceed to step S13, wherein it is determined whether I is greater than 32; if not, then return to step S4 after making the value of I shift left by one bit in step S14 (that is, multiplying the value of I by 2).

Figure 3C:
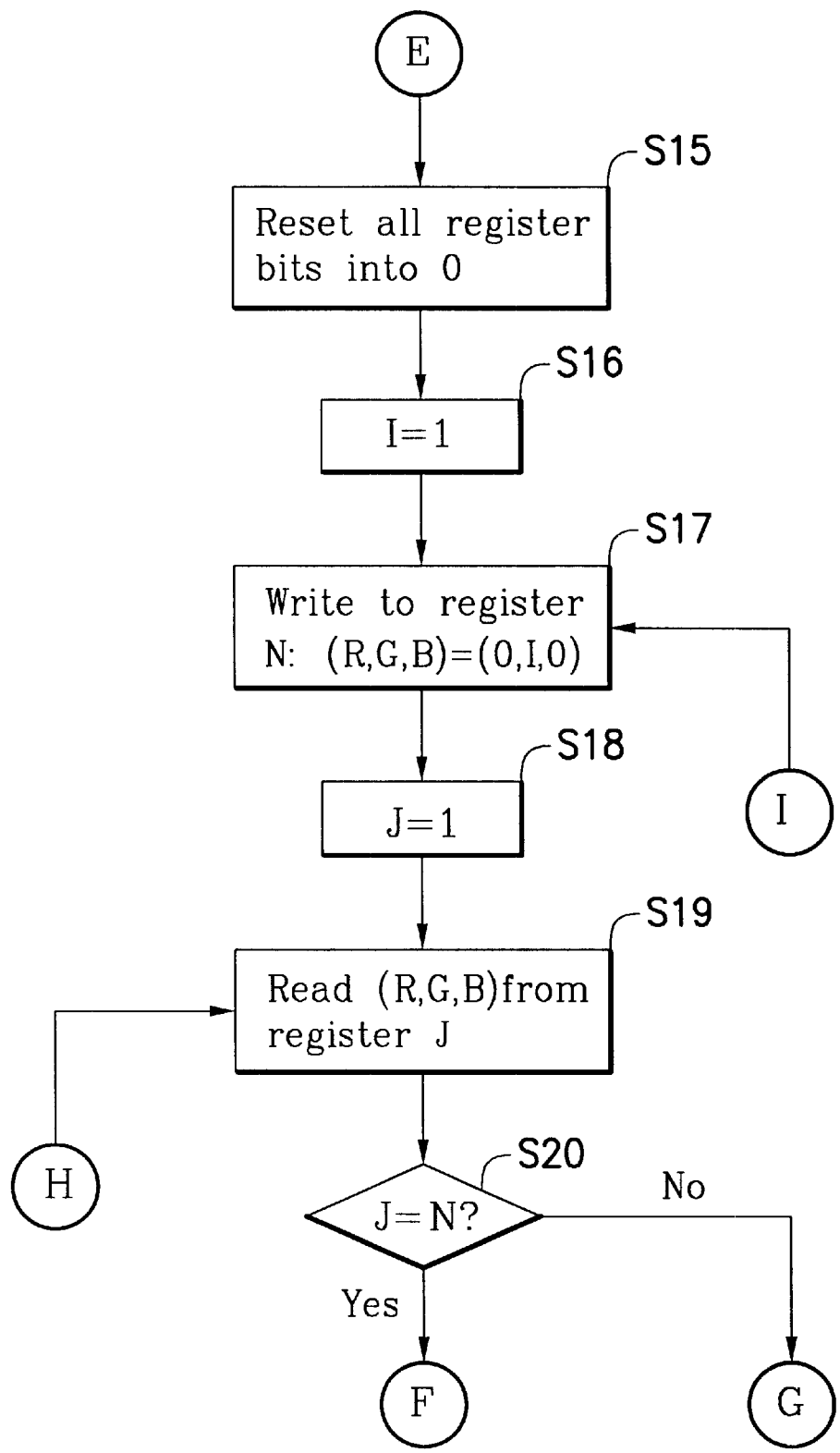

Next, in step S13, if it is known that I is greater than 32, then proceed to step S15, as shown in FIG. 3C, to reset the color values of each register of the RAMDAC into 0. Then in step S16, the initial value of I is set to 1, followed by step S17, wherein (0, I, 0) are written into the R, G, and B color values of the register N ($R_N,G_N,B_N$). Further in step S18, the initial value of J is set to 1, followed by the step S19, wherein the R, G, and B color values ($R_J,G_J,B_J$) are read from the register J. Next, step S20, it is determined whether J is equal to N.

Figure 3D:
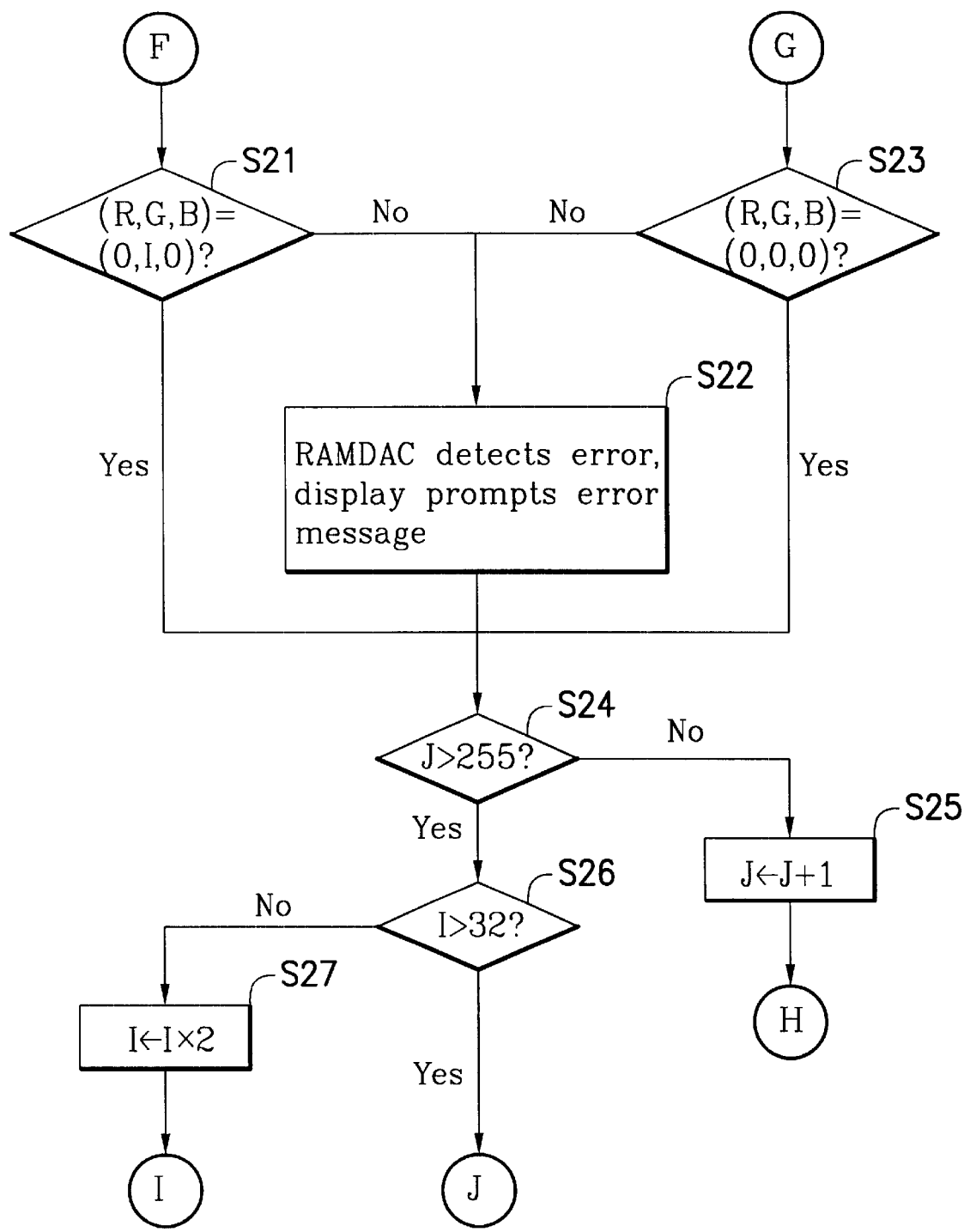

Referring to FIG. 3D, if in step S20, it is known that J equals N, then proceed to step S21 to determine whether the R, G, and B color values ($R_J,G_J,B_J$) equal (0,I,0); if not, then proceed to step S22 to display an error message. If in step S20, it is known that J does not equal N, then proceed to step S23 to determine whether the R, G, and B color values ($R_J,G_J,B_J$) equal (0,0,0). If not, then proceed to step S22 to display an error message. If in steps S21 or S23, the R, G, and B color values ($R_J,G_J,B_J$) are known to equal (0,I,0) or (0,0,0) respectively, then proceed to step S24 to determine whether J 10 is greater than 255. If J is smaller than or equal to 255, then proceed to step S25 to increase the value of J by one and return to step S19. If J is greater than 255, then proceed to step S26 to determine whether I is greater than 32; if not, then return to step S17 after making the value of I shift left by one bit in step S27 (that is, multiplying the value of I by 2).

Figure 3E:
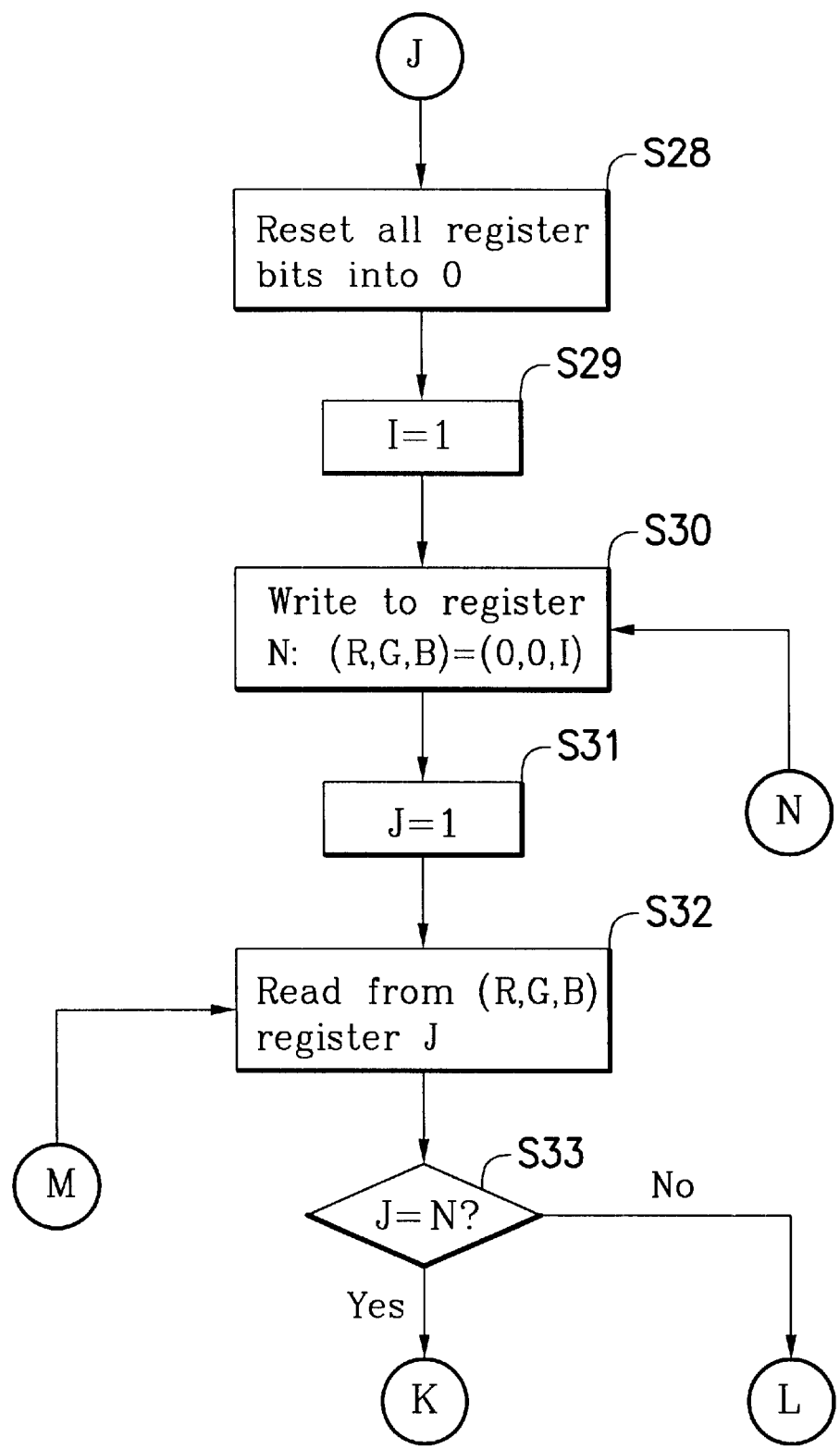

Next, in step S26, if it is known that I is greater than 32, as shown in FIG. 3E, then proceed to step S28 to reset the color values of each register of the RAMDAC to 0. Then in step S29, the initial value of I is set to 1, followed by step S30, wherein (0,0,I) are written into the R, G, and B color values of the register N ($R_N,G_N,B_N$). Further in step S31, the initial value of J is set to 1, followed by the step S32, wherein the R, G, and B color values ($R_J,G_J,B_J$) are read from the register J. Next, step S33, it is determined whether J is equal to N.

Figure 3F:
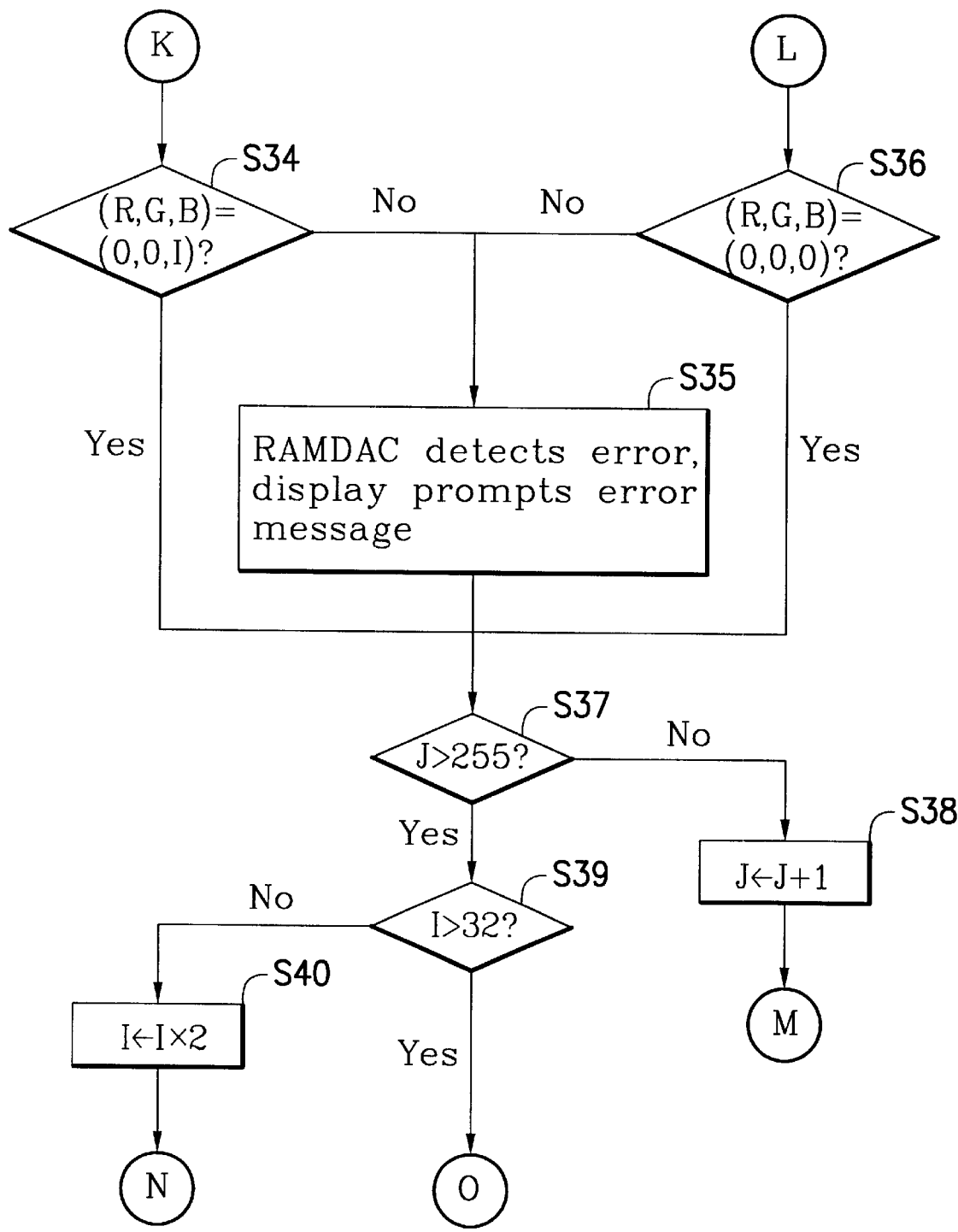

Referring to FIG. 3F, if in step S33, it is known that J equals N, then proceed to step S34 to determine whether the R, G, and B color values ($R_J,G_J,B_J$) equal (0,0,I); if not, then proceed to step S35 to display an error message. If in step S33, it is known that J does not equal N, then proceed to step S36 to determine whether the R, G, and B color values ($R_J,G_J,B_J$) equal (0,0,0). If not, then proceed to step S35 to display an error message. If in steps S34 or S36, the R, G, and B color values ($R_J,G_J,B_J$) are known to equal (0, 0, I) or (0,0,0) respectively, then proceed to step S37 to determine whether J is greater than 255. If J is smaller than or equal to 255, then proceed to step S38 to increase the value of J by one and return to step S32. If J is greater than 255, then proceed to step S39 to determine whether I is greater than 32; if not, then return to step S30 after making the value of I shift left by one bit in step S40 (that is, multiplying the value of I by 2).

Figure 3G:
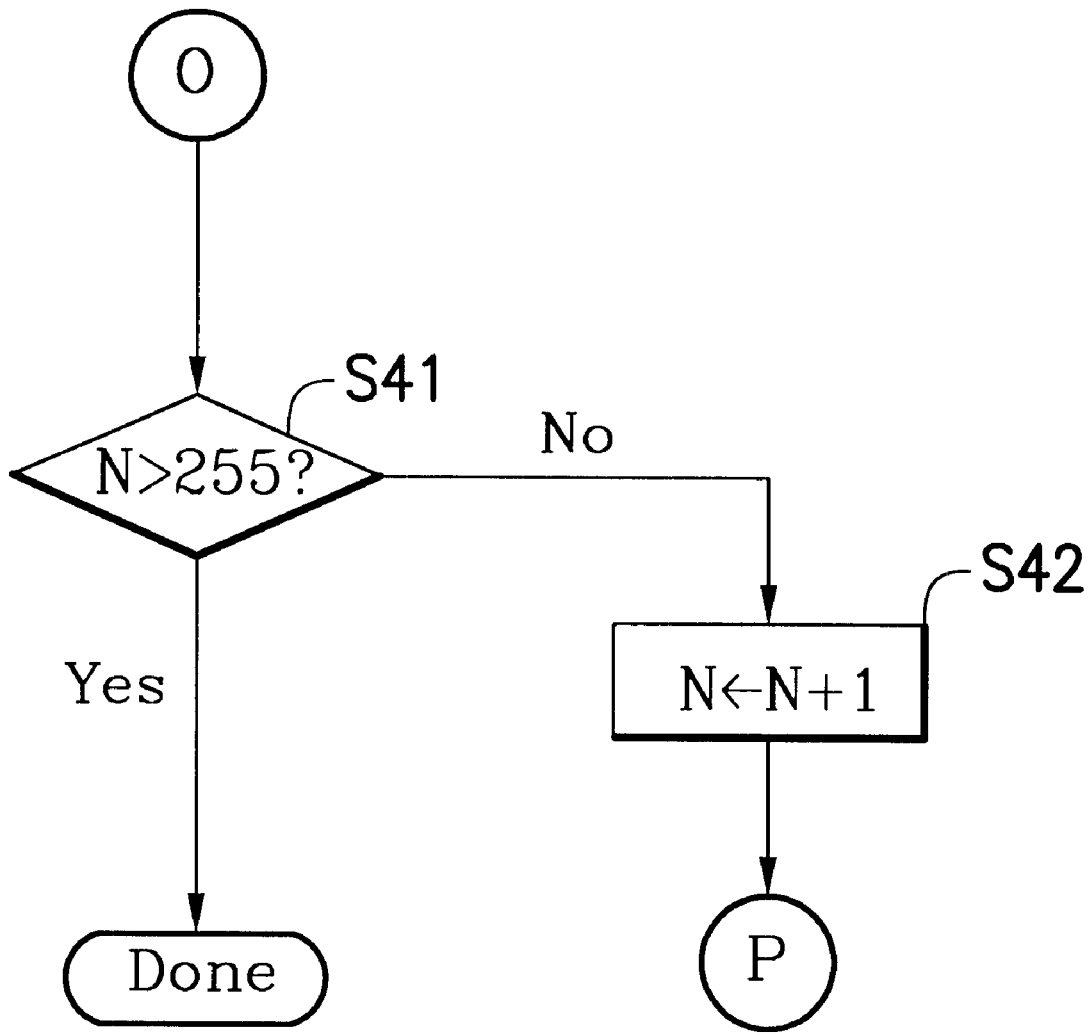

Referring to FIG. 3G, if in step S39, if it is known that I is greater than 32, then proceed to step S41 to determine whether N is greater than 255. If not, then increase the value of N by one in step S42 and then return to step S3. If N is greater than 255, then the register testing method is thereby completed.

Briefly, the testing method as specified in FIGS. 3A–3G resets every bit of each register to 0, then proceeds to perform reading operation after sequentially writing 1 into every bit of the registers. For example, the color values (R, G, B) being sequentially written are set to $(000001,000000,000000)_B$, $(000010,000000,000000)_B$, ..., $(100000,000000,000000)_B$, $(000000,000001,000000)_B$, $(000000,000010,000000)_B$, ..., $(000000,100000,000000)_B$, $(000000,000000,000001)_B$, $(000000,000000,000010)_B$, ..., $(000000,000000,100000)_B$ and so forth. Data will be read after being written for matching the written data with the read data and for obtaining whether registers correctly read, write, and save color values.

Referring to FIGS. 4A–4G, flowcharts illustrating the register testing method in accordance with a second preferred embodiment of the present invention. This embodiment is specified with examples of R, G, B color layers represented in six bits.

Figure 4A:
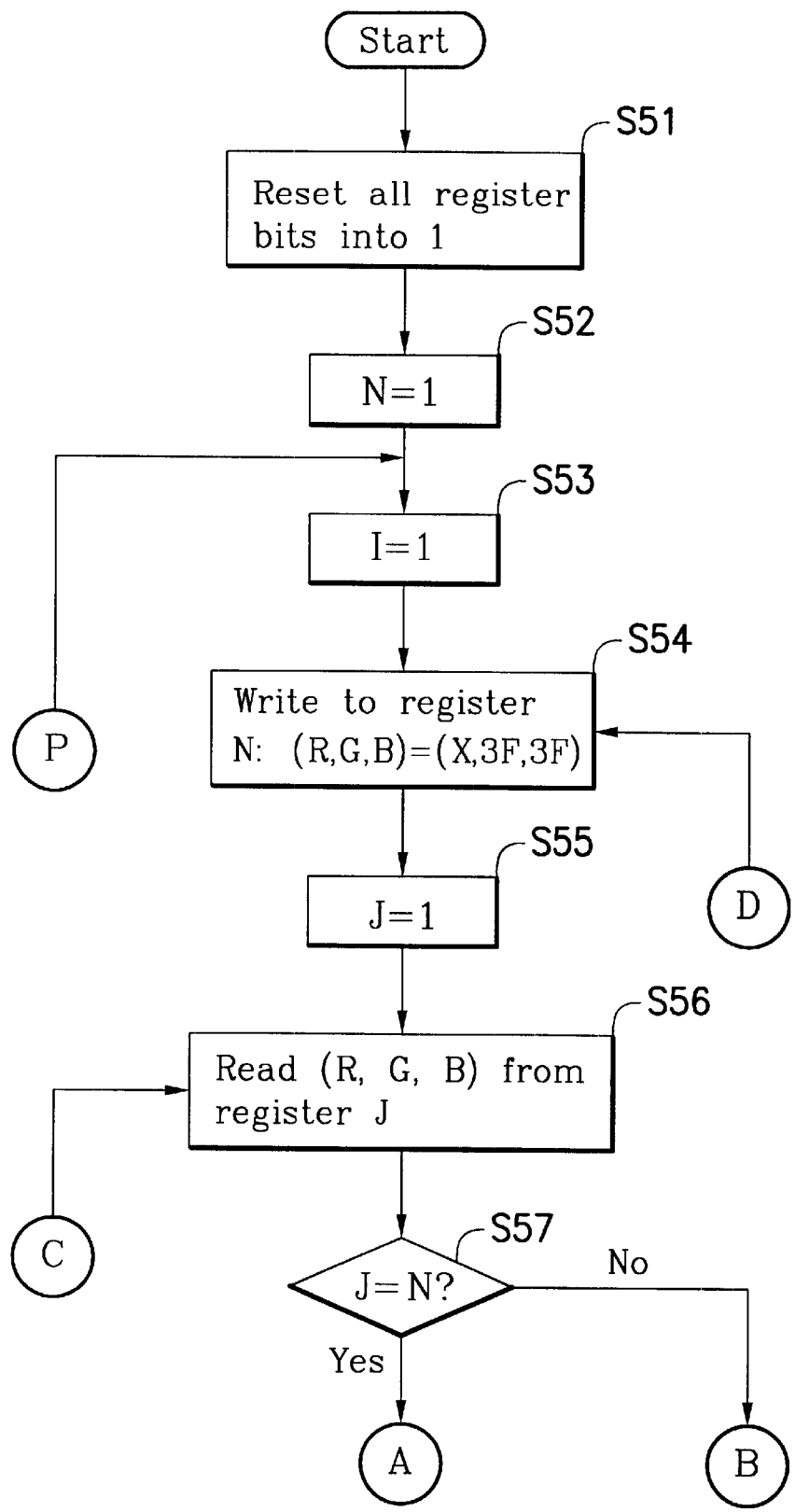
FIGS. 4A–4G are flowcharts illustrating the testing method of registers in accordance with a second preferred embodiment of the present invention.

Referring to FIG. 4A, first the color values in each register of the RAMDAC are reset to 1 in step S51. Next, the initial values of N and I are respectively set to 1 in steps S52 and S53. Further (X,3F,3F), is written into the R, G, and B color value in the register N ($R_N,G_N,B_N$) in step S54, where X represents the 1's-complement of binary value I. Further, the initial value of J is set to 1 in step S55; and the R, G, and B color values ($R_J,G_J,B_J$) are read from the register J in step S56; followed by step S57, wherein it is determined whether J is equal to N.

Figure 4B:
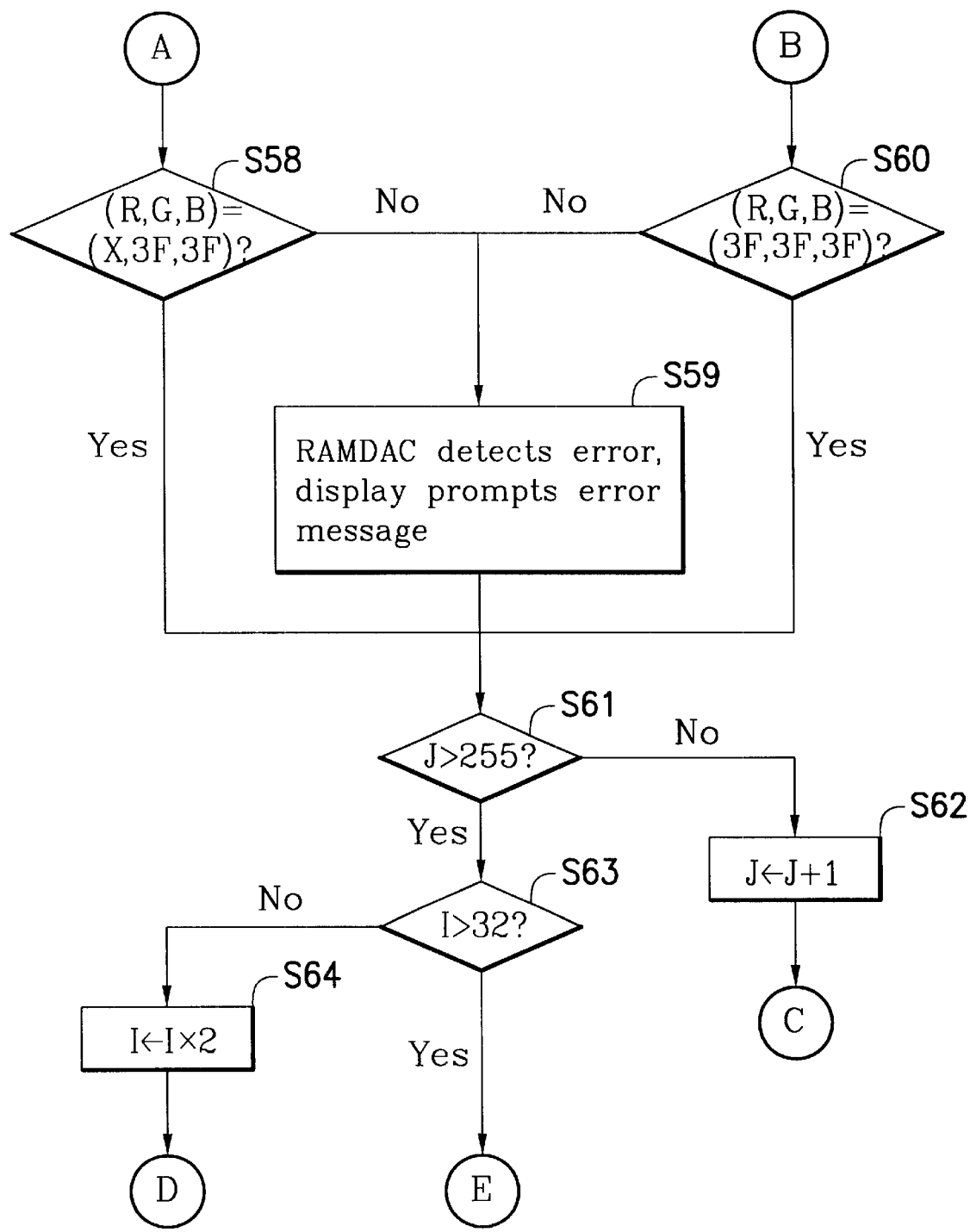

Referring to FIG. 4B, if in step S57, it is known that J equals N, then proceed to step S58 to further determine whether the color values of the register J ($R_J,G_J,B_J$) equal $(X,3F,3F)_H$. If not, then an error message is displayed in step S59. If it is known in step S57 that J does not equal N, then proceed to step S60 to determine whether the R, G, and B color values of the register J ($R_J,G_J,B_J$) equal $(3F,3F,3F)_H$. If not, then proceed to step S59 to display an error message. If it is known in steps S58 and S60 that the color values of the register J ($R_J,G_J,B_J$) equal to $(X,3F,3F)_H$ or $(3F,3F,3F)_H$ respectively, then proceed to step S61, wherein it is determined whether J is greater than 255. If J is smaller than or equal to 255, then proceed to step S62 to increase the value of J by one and return to step S56. If J is greater than 255, then proceed to step S63, wherein it is determined whether I is greater than 32. If not, then return to step S54 after making the value of I shift left by one bit in step S64 (that is, multiplying the value of I by 2).

Figure 4C:
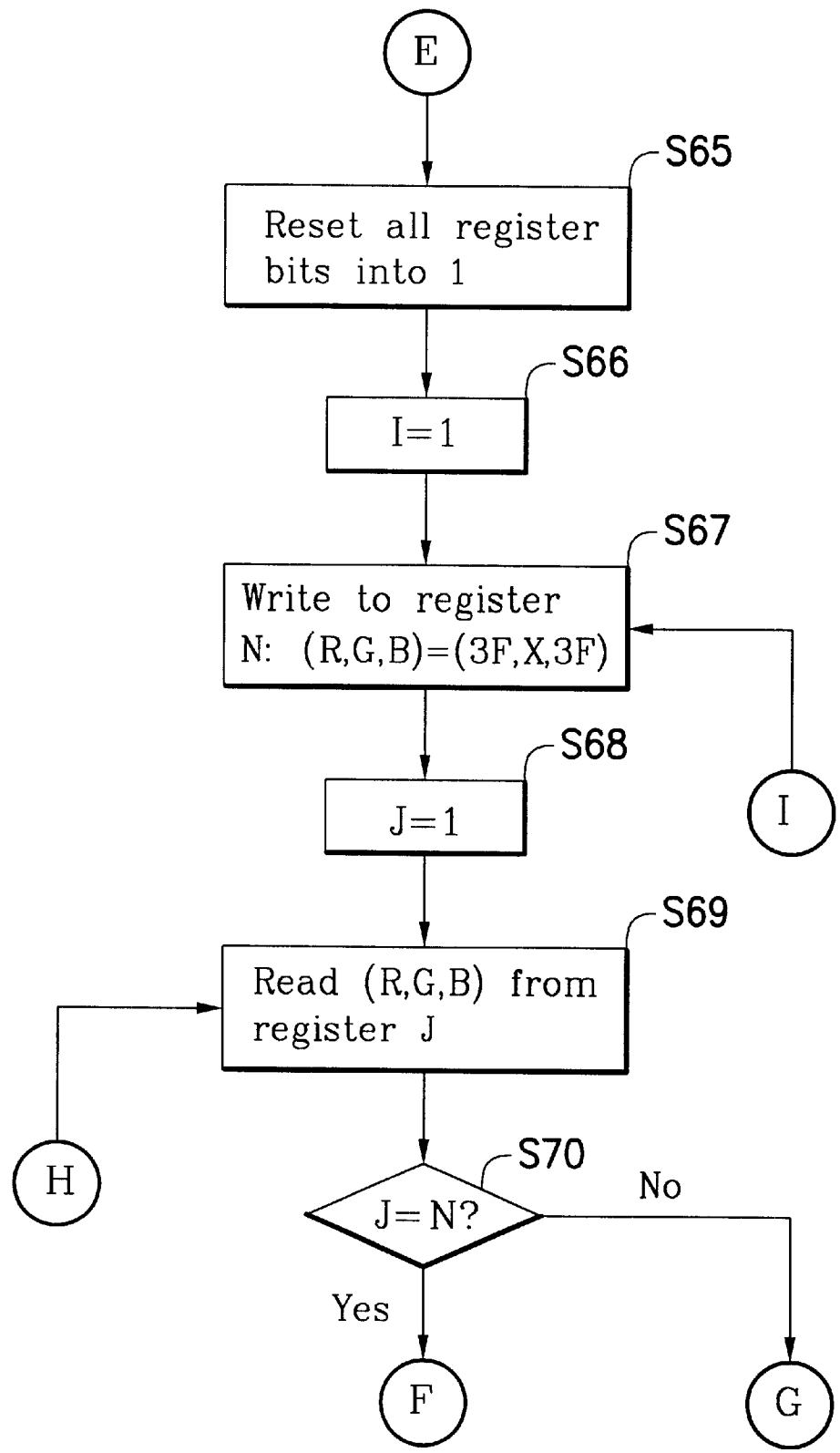

Next, in step S63, if it is known that I is greater than 32, as shown in FIG. 4C, then proceed to step S65 to reset the color values of each register of the RAMDAC into 1. Then in step S66, the initial value of I is set to 1, followed by step S67, wherein $(3F,X,3F)_H$ are written into the R, G, and B color values of the register N $(R_N, G_N, B_N)$, where X is the 1's-complement representation of I. Further in step S68, the initial value of J is set to 1, followed by the step S69, wherein the R, G, and B color values $(R_J,G_J,B_J)$ are read from the register J. Next, step S70, it is determined whether J is equal to N.

Figure 4D:
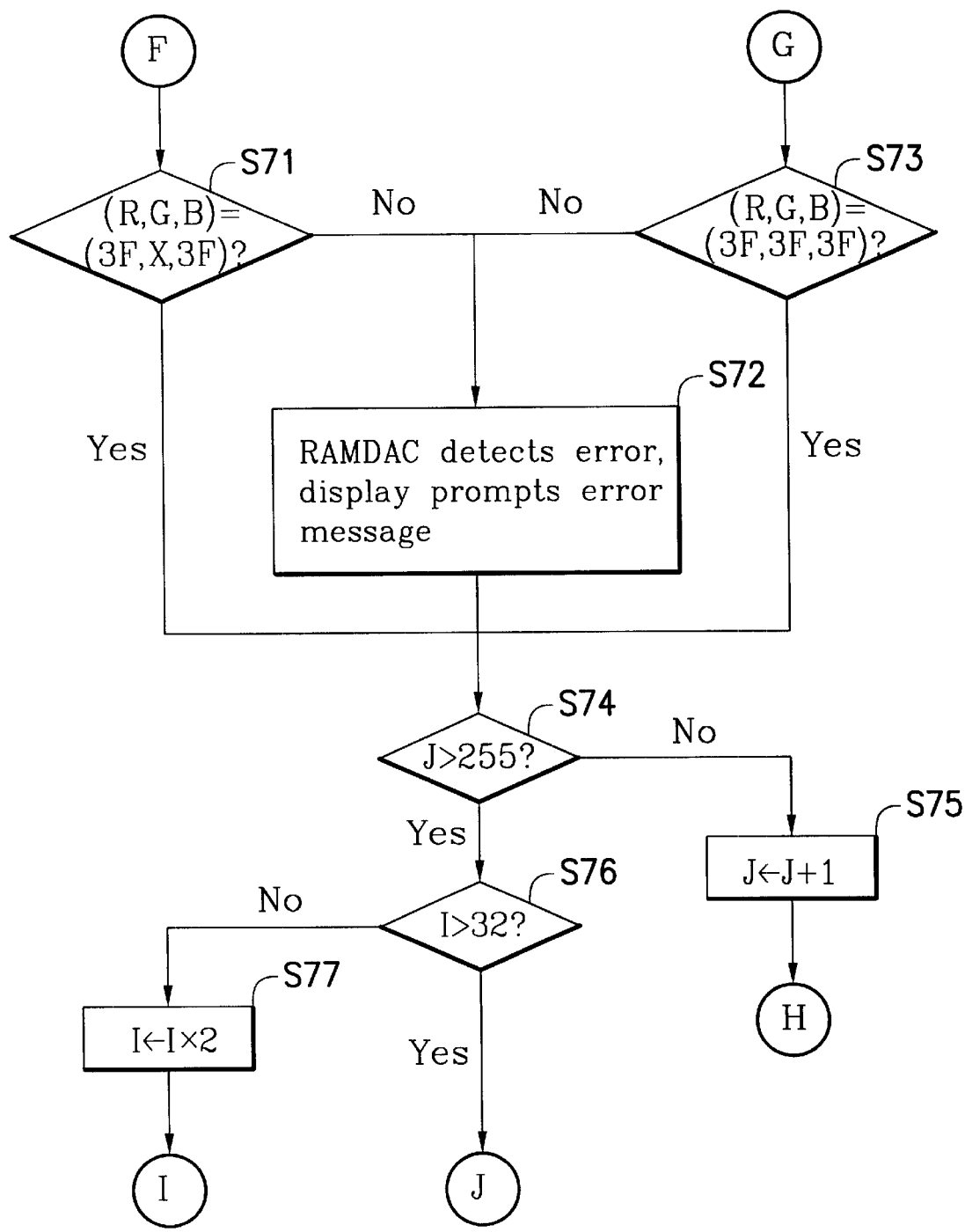

Referring to FIG. 4D, if in step S70, it is known that J equals N, then proceed to step S71 to determine whether the R, G, and B color values $(R_J,G_J,B_J)$ equal $(3F,X,3F)_H$; if not, then proceed to step S72 to display an error message. If in step S70, it is known that J does not equal N, then proceed to step S73 to determine whether the R, G, and B color values $(R_J,G_J,B_J)$ equal $(3F,3F,3F)_H$. If not, then proceed to step S72 to display an error message. If in steps S71 or S73, the R, G, and B color values $(R_J,G_J,B_J)$ are known to equal $(3F,X,3F)_H$ or $(3F,3F,3F)_H$ respectively, then proceed to step S74 to determine whether J is greater than 255. If J is smaller than or equal to 255, then proceed to step S75 to increase the value of J by one and return to step S69. If J is greater than 255, then proceed to step S76 to determine whether I is greater than 32; if not, then return to step S67 after making the value of I shift left by one bit in step S77 (that is, multiplying the value of I by 2).

Figure 4E:
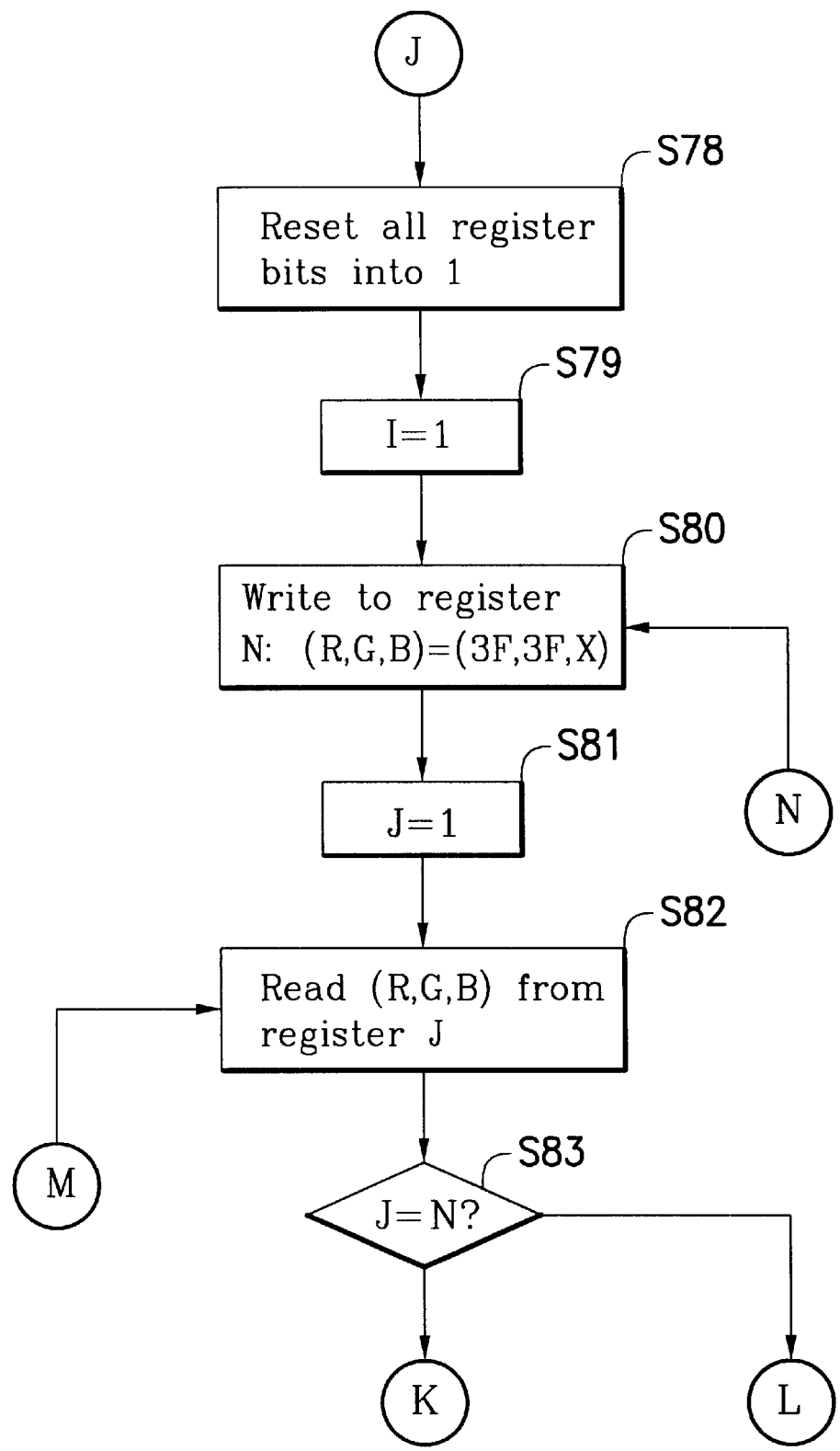

Next, in step S76, if it is known that I is greater than 32, as shown in FIG. 4E, then proceed to step S78 to reset the color values of each register of the RAMDAC into 1. Then in step S79, the initial value of I is set to 1, followed by step S80, wherein the 1's-complement of I is taken to make the X value and $(3F,3F,X)_H$ are written into the R, G, and B color values of the register N $(R_N,G_N,B_N)$. Further in step S81, the initial value of J is set to 1, followed by the step S82, wherein the R, G, and B color values $(R_J, G_J, B_J)$ are read from the register J. Next, step S83, it is determined whether J is equal to N.

Figure 4F:
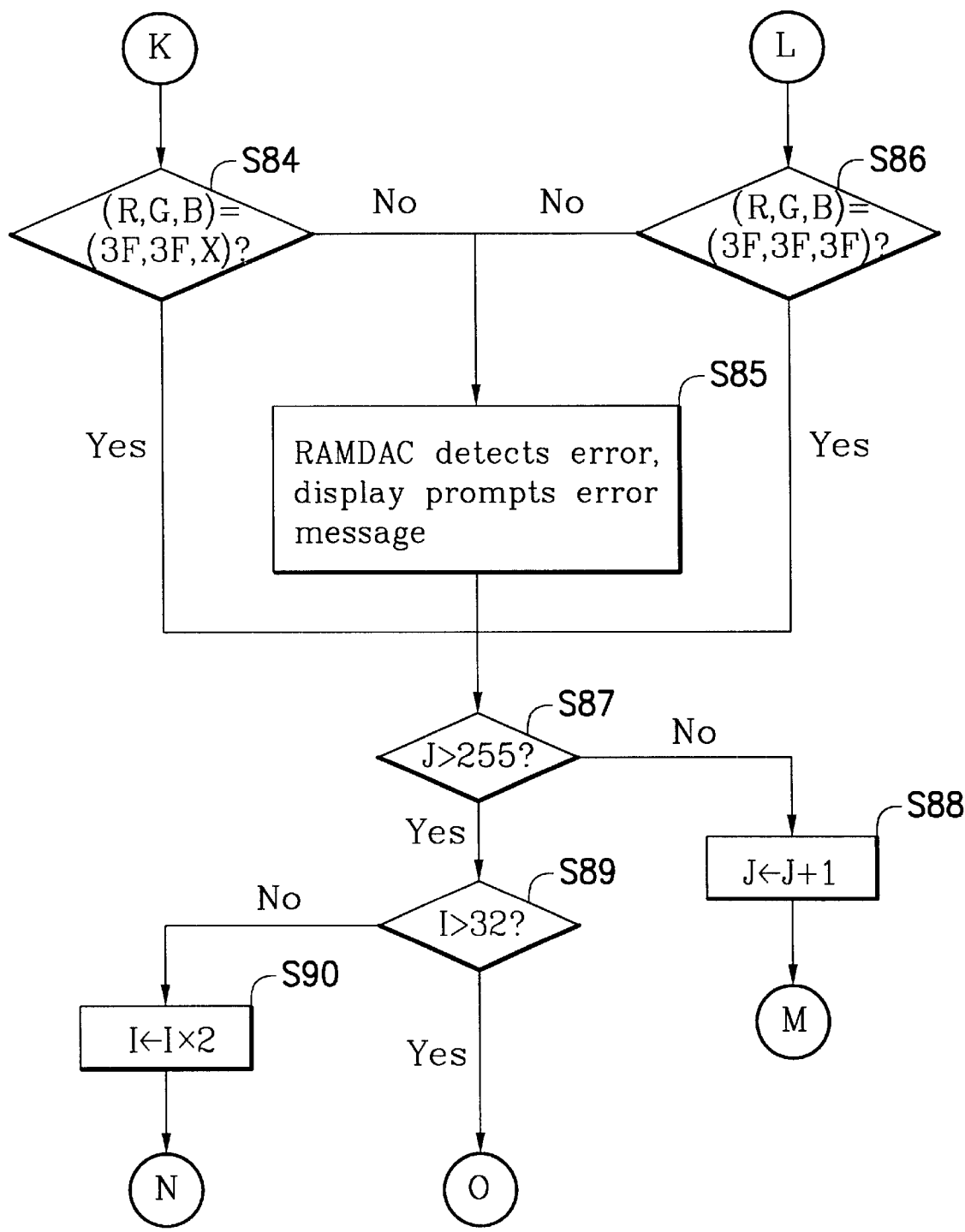

Referring to FIG. 4F, if in step S83, it is known that J equals N, then proceed to step S84 to determine whether the R, G, and B color values $(R_J, G_J, B_J)$ equal $(3F,3F,X)_H$; if not, then proceed to step S85 to display an error message; If in step S83, it is known that J does not equal N, then proceed to step S86 to determine whether the R, G, and B color values $(R_J,G_J,B_J)$ equal $(3F,3F,3F)_H$. If not, then proceed to step S85 to display an error message. If in steps S84 or S86, the R, G, and B color values $(R_J,G_J,B_J)$ are known to equal $(3F,3F,X)_H$ or $(3F,3F,3F)_H$ respectively, then proceed to step S87 to determine whether J is greater than 255. If J is smaller than or equal to 255, then proceed to step S88 to increase the value of J by one and return to step S82. If J is greater than 255, then proceed to step S89 to determine whether I is greater than 32; if not, then return to step S80 after making the value of I shift left by one bit in step S90 (that is, multiplying the value of I by 2).

Figure 4G:
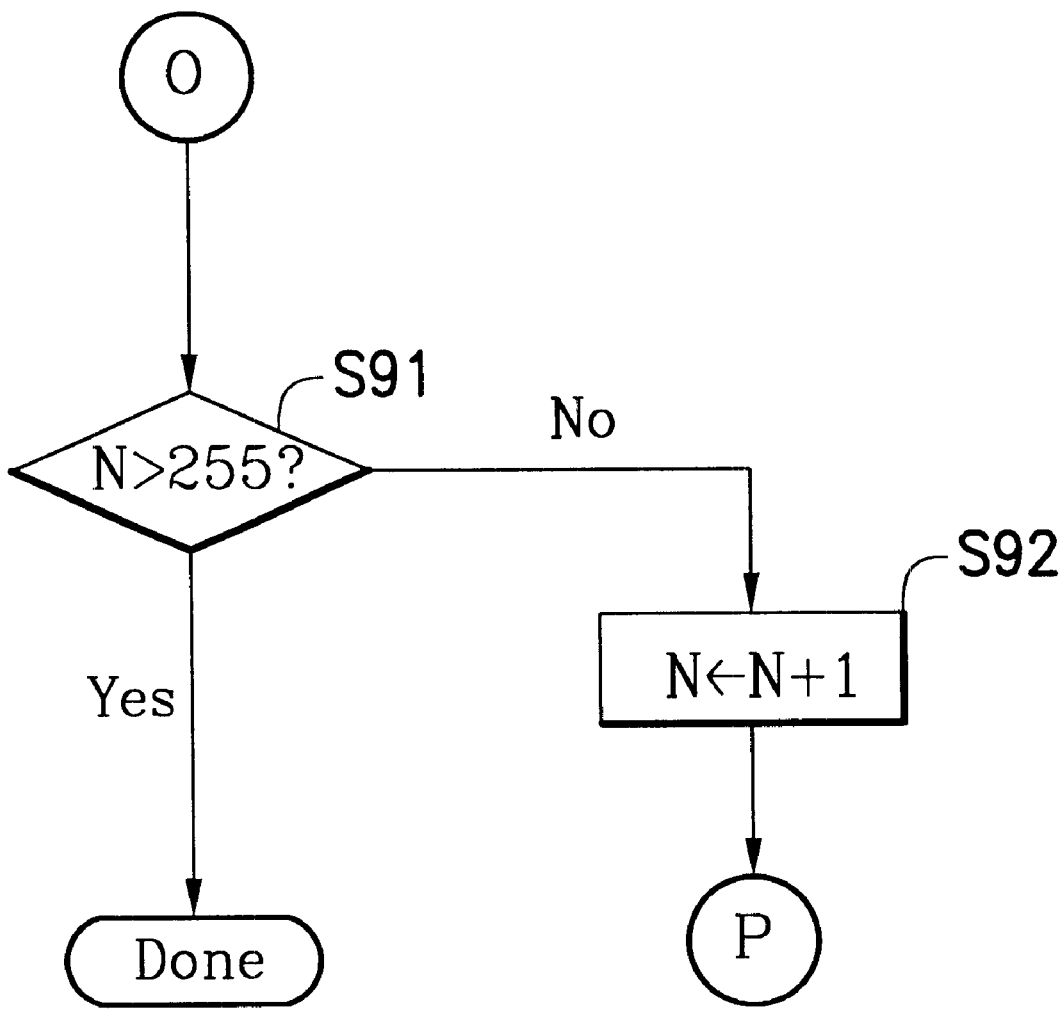

Referring to FIG. 4G, if in step S89, if it is known that I is greater than 32, then proceed to step S91 to determine whether N is greater than 255. If not, then increase the value of N by one in step S92 and then return to step S53. If N is greater than 255, then the register testing method is thereby completed.

Briefly, the testing method as specified in FIGS. 4A–4G resets every bit of each register to 1, then proceed to perform reading operation after sequentially writing 0 into every bit of the registers. For example, the color values (R, G, B) being sequentially written are set to $(111110,111111,111111)_B$, $(111101,111111,111111)_B$, ..., $(011111,111111,111111)_B$, $(111111,111110,111111)_B$, $(111111,111101,111111)_B$, ..., $(111111,011111,111111)_B$, $(111111,111111,111110)_B$, $(111111,111111,111101)_B$, ..., $(111111,111111,011111)_B$ and so forth. Data will be read after being written for matching the written data with the read data and for obtaining whether registers correctly read, write, and save color values.

Figure 5:
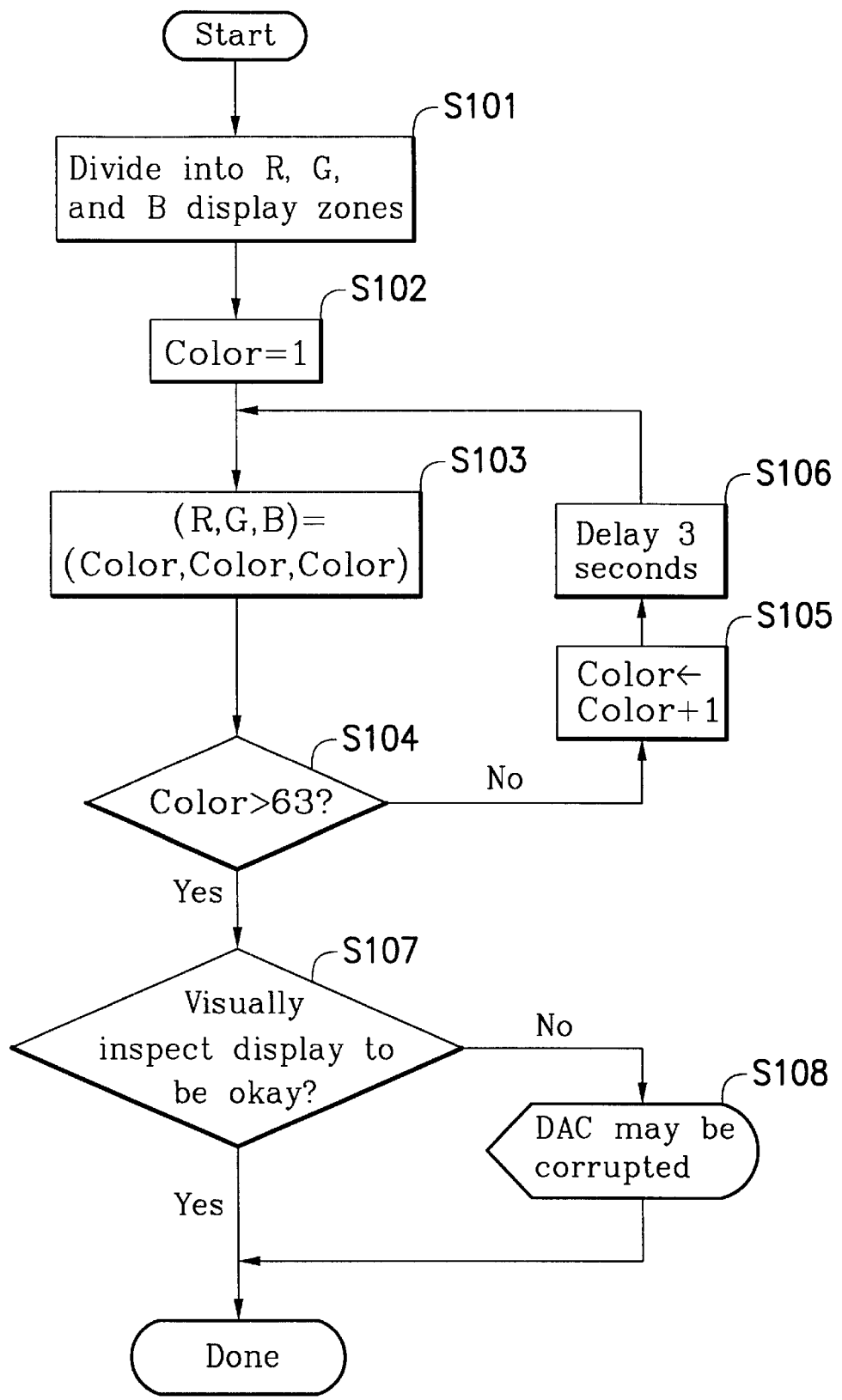
FIG. 5 is a flowchart illustrating the display method of even layers of R, G, B colors in accordance with one preferred embodiment of the present invention.

Referring to FIG. 5, a flowchart illustrating the method of displaying even layers of R, G, B colors in accordance with a preferred embodiment of the present invention. In this case, a 256 color mode is given.

As shown in FIG. 5, first in step S101, the display area is divided into three, namely, R, G, and B zones. Then, the Color values are reset to 1 in step S102, and the color values of the registers (R,G,B) are set to (Color,Color,Color) in step S103. Further, in step S104 the Color values are determined to be greater than 63 or not; if not, then proceed to step S105 to increase the Color value by one, and proceed then to step S106 to display the current Color values for three seconds, and return finally to step S103. If in step S104, the Color value is known to be greater than 63, then proceed to step S107 of visually inspecting whether the display is normal. If the display unit does not demonstrate even changes from darkness to brightness, then it means an error might have occurred when the digital color values are converted into analog R, G, and B video signals. Hence in step S108, it can be determined that the digital/analog converter might be corrupted.

Therefore, the RAMDAC testing method of the present invention can detect whether the registers can correctly read, write, and save color values; then display even R, G, and B color layers for visually inspecting whether the RAMDACs correctly convert digital color data into analog R, G, and B video signals through even display of R, G, and B color layers.

Although the present invention has been described in its preferred embodiment, it is not intended to limit the invention to the precise embodiment disclosed herein. Those who are skilled in this technology can still make various alterations and modifications without departing from the scope and spirit of the present invention. Therefore, the scope of the present invention shall be defined and protected by the following claims and their equivalents.

What is claimed is:

1. A method of testing a plurality of registers in a RAMDAC, each of said registers having a plurality of bits; said method comprising:

(a) resetting said bits of said registers into a first logic state;

(b) writing a first logic pattern in said registers to convert one bit of one of said registers into a second logic state, and immediately reading out another logic pattern from said registers;

(c) prompting an error message when a second logic pattern differs from said first logic pattern; and (d) repeating said steps (b) and (c) until the testing of each of said bits of said registers is completed.

2. The method as claimed in claim 1, wherein said first logic state is a logic-0 and said second logic state is a logic-1.

3. The method as claimed in claim 1, wherein said first logic state is a logic-1 and said second logic state is a logi-0.

* * * * *